TOUCH-SENSITIVE OPTOELECTRONIC CIRCUITS AND INDICATORS

Filed Aug. 17, 1961 4 Sheets-Sheet 1

INVENTOR:
THOMAS E. BRAY,

BY Dudley T. Ready
HIS AGENT.

TOUCH-SENSITIVE OPTOELECTRONIC CIRCUITS AND INDICATORS

INVENTOR:
THOMAS E. BRAY,

BY Dudley T. Ready
HIS AGENT.

INVENTOR:
THOMAS E. BRAY,
BY Dudley T. Ready
HIS AGENT.

TOUCH-SENSITIVE OPTOELECTRONIC CIRCUITS AND INDICATORS

Filed Aug. 17, 1961 4 Sheets-Sheet 4

INVENTOR:
THOMAS E. BRAY,

BY Dudley T. Ready
HIS AGENT.

United States Patent Office 3,207,905
Patented Sept. 21, 1965

3,207,905
TOUCH-SENSITIVE OPTOELECTRONIC CIRCUITS AND INDICATORS

Thomas E. Bray, Clay, N.Y., assignor to General Electric Company, a corporation of New York
Filed Aug. 17, 1961, Ser. No. 132,178
6 Claims. (Cl. 250—206)

The invention relates to novel touch-sensitive optoelectronic circuits which perform electrical and optoelectronic control functions and/or serve as visual indicators. These circuits are suitable for a wide range of applications generally coextensive with manually operated low power electrical switches and indicators. In the more complex applications such as keyboards, the circuits are adaptable to perform specialized functions such as key lock-out.

The common, manually operated, push button device is representative of the switches and indicators which are replaceable by the optoelectronic touch-sensitive circuits described herein. The term "touch-sensitive" is used to denote responsiveness to contact by a finger or thumb (generically referred to as "digits"), however, responsiveness to a digit generally results in responsiveness to any skin surface. A push button device consists of a mechanically displaceable element which typically operates a switch to close an electric circuit and thereby initiates or controls a machine operation. Often, these switches also rely upon the mechanical displacement of the push button as a visual indication of the operation of the switch. Push button devices, because of their mechanical nature, have inherent limitations. As in all devices which have mechanical motion, failure due to erosion, jamming, etc., can not be completely eliminated. When a large number of such switches are required, as in a desk calculator key board, there are difficulties in inexpensively manufacturing an array of manually operated switches and in providing reliable connections between the key board and electrical circuits operated thereby. A major source of these difficulties is the requirement for both mechanical and electrical elements and their operative relationship.

To overcome the limitations of a mechanical switch, manually operated switches have been developed which have no moving parts. These switches necessarily use the physical properties of the human body, such as its opaqueness to a light beam, to activate a switching device. The use of the electrical properties of skin is limited by the necessity for avoiding a shock hazard. However, a known type of switch which has been used for applications such as control of conventional lighting is the "Touchtron" manufactured by the General Electric Company. This device utilizes a gas discharge tube which is responsive to a voltage induced by the potential of a human body applied by digit contact to electrically control a switch. However, the "Touchtron" requires electrical connections with the controlled device similar to that of a push button operated relay and, because of the tube required, it is not readily adaptable to a printed-circuit type of device fabrication.

A visual indication of the manual operation of a push button (or similar device) is frequently desired at both the device itself and a display panel on which the condition of many manually operated devices are displayed. In a desk calculator, for example, the keyboard is comprised of an array of keys divided into columns corresponding to decimal orders. The operation of a key typically results in one of many numeral wheels on a display panel being rotatably displaced to a position indicative of which key was operated (in addition to initiating a calculator operation). An indicator which is equivalent to the numeral wheel is an array of fixed surface elements geometrically arranged in a plane so that the surface presented by a selectable combination of elements is a numeral character. When the surface elements are electroluminescent or equivalent light radiating devices, and are arranged to be selectively energized, an indicator results which presents a variable display. This type of display is adapted to display other characters such as letters of the alphabet.

Electroluminescent elements are generally operated by an A.-C. voltage source, typically 120 volts R.M.S. at 400 c.p.s. However, electroluminescent elements can be operated by voltage sources having frequencies from D.-C. to thousands of cycles per second and over a substantial range of voltages. These elements have several desirable properties. They are very compact, normally fabricated as a deposited layer between a pair of electrodes and the fabrication readily takes the form of inexpensive printed circuit type techniques for both the conductors and the electroluminescent material. With a proper voltage source connected in series with a switch, the electroluminescent elements are inherent visual indicators of state for the switch.

Electroluminescent elements are also essential components of a class of electrical switching circuits which perform general digital logic operations. This class of switching circuits utilizes associated photoconductors and electroluminescent elements which are well adapted to perform relay type operations. Various survey articles have appeared in the literature describing these devices of which the following is an example: Proceedings of the IRE, Volume 47, No. 1, pages 4–11, January 1959 ("Photoelectronic Circuit Applications," by Sorab K. Ghandhi).

It is an object of the invention to provide a touch-sensitive circuit which is compatible with electroluminescent display devices and optoelectronic logic circuits and is suitable for general application including control of electronic circuits such as transistor logic circuits.

It is another object of the invention to provide a touch-sensitive circuit to serve as a manually operated indicator and/or switch suitable for general application which has no moving parts.

It is further object of the invention to provide a touch-sensitive circuit which does not present a shock hazard.

It is a still further object to provide an array of touch-sensitive circuits which are adapted to perform functions such as key lock-out and keyboard clearing operations.

It is another object of the invention to provide a touch-sensitive circuit which is well adapted to a printed circuit type of fabrication.

Briefly stated, in accordance with one aspect of the invention, a touch-sensitive optoelectronic indicator circuit is provided which utilizes an electroluminescent element, having a large impedance, to radiate light that serves as a control signal for associated photoconductor-electroluminescent circuits and/or provides a visual indication of state. The relation of light radiated to applied voltage for an electroluminescent element is characterized by a dark condition for low voltages and by an increasing amount of light radiation for increased voltages. A voltage source is provided which supplies a constant amplitude voltage exceeding the threshold level. A normally open, touch-sensitive switch is connected in series with the electroluminescent element and the constant voltage source to form a closed loop series circuit. Accordingly, the electroluminescent element is normally dark in the absence of activation by a digit contact. The touch-sensitive switch is comprised of fixed conductors which are separated by an insulator but which are arranged so that the separated conductors can be bridged by a digit in such a manner that the digit surface supplies a current path having an impedance that is small relative to the impedance of the electroluminescent element. When so bridged, this is effectively a closed circuit for the high impedance electroluminescent element which is then activated to the light radiating or "ON" state. The low impedance of the touch-sensitive switch relative to the high impedance electroluminescent element results in only low voltages being applied to the contacting digit and the high impedance of the electroluminescent element in series with the touch-sensitive switch, insures that the currents encountered are very small and the shock hazard is thereby obviated.

In accordance with another aspect of the invention, a touch-sensitive circuit is provided comprised of electroluminescent-photoconductor devices having a "lock-on" operating characteristic. The basic circuit is a modification of the indicator circuit above having an electroluminescent element, a constant amplitude voltage source and a touch-sensitive switch in a closed loop series circuit. The circuit is modified by the addition of a photoconductor which is connected in shunt with the touch-sensitive switch and is arranged to receive light from the electroluminescent element thus forming an electroluminescent-photoconductor pair. When the electroluminescent element is not activated (in the "OFF" state), the photoconductor and the touch-sensitive switch present an effective open circuit to the electroluminescent element because of the very high impedance of the photoconductor in the "dark" state. However, when the electroluminescent element is activated by a digit contact of the touch-sensitive switch, the electroluminescent element will radiate light which changes the photoconductor to the low impedance state. This causes a larger proportion of the voltage supply to appear across the electroluminescent element independently of the touch-sensitive switch. The result is that the circuit will lock-on to the ON state and the electroluminescent element will continue to radiate light after the digit is removed from contact with the touch-sensitive switch. As in the indicator circuit above, associated circuits having a photoconductor are conveniently controlled by arranging the photoconductor to receive part of the light radiated by the electroluminescent element when it is in the ON state.

In accordance with a further aspect of the invention, circuit interconnections are made for a plurality of individual lock-on touch-sensitive circuits which insure a lock-out operation whereby only one of the electroluminescent-photoconductor pairs comprising the individual circuits can be in the ON state, and the operation of a second individual circuit inactivates any previously operated circuit. The lock-out operation is realized by utilizing a common voltage supply for all the individual touch-sensitive lock-on circuits which are connected in parallel, providing voltage regulating means, and selecting component values such that the individual circuits comprised of electroluminescent-photoconductor pairs are responsive to the voltage regulation. In one embodiment, this lock-out feature is provided by selecting uniform components for the individual touch-sensitive circuits and providing a voltage limiting impedance in series with the constant voltage source. This impedance is selected such that any one individual electroluminescent-photoconductor pair operates as the lock-on circuit described above, but the lowered impedance of the individual circuits in the ON state is such that the parallel combination of two circuits in the ON state reduces the voltage thereacross to a value insufficient to maintain the previously activated electroluminescent-photoconductor pair in the ON state. Accordingly, the previously activated circuit is returned to the OFF state and digit contact of the second individual circuit locks out any previously activated circuit.

The features of the invention which are believed to be novel are set forth with particularity in the appended claims. The invention itself, however, both as to its organization and method of operation, together with further objects and advantages thereof, may best be understood by reference to the following description when taken in connection with the drawings, wherein:

Figure 1:
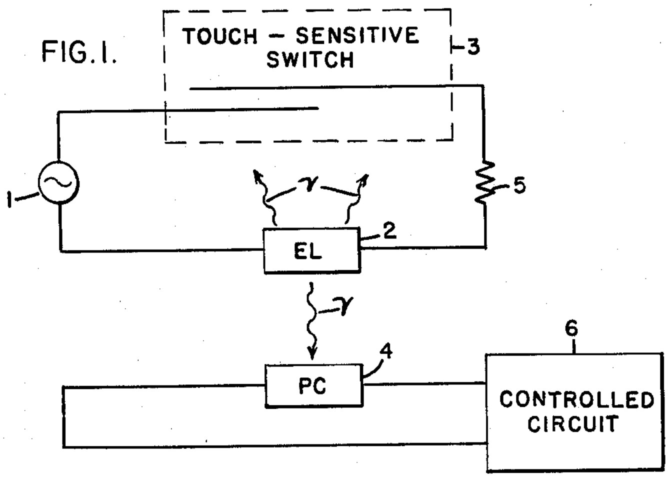
FIGURE 1 is a diagram of a touch-sensitive circuit employing an electroluminescent element.

FIGURE 1 illustrates a touch-sensitive circuit which is activated to an ON state by digit contact and is otherwise in an OFF state. The primary circuit is comprised of a constant voltage source 1, an electroluminescent (EL) element 2, and a touch-sensitive switch 3. The surface of electroluminescent element 2 radiates a substantial amount of light as represented by the wavy arrow $\gamma$ when a substantial voltage is applied thereacross. With an electroluminescent element of activated zinc sulfide, 100 volts is a typical operating voltage level for a 400 c.p.s. voltage source. An A.-C. voltage source of 120 volts serially connected with the electroluminescent element and the touch-sensitive switch 3 will not turn the element ON when the switch 3 is open. However, if switch 3 is arranged to provide an impedance which is small relative to the impedance of the electroluminescent element when touched by a digit, the voltage applied across the electroluminescent element 2 will exceed the operating voltage level and it will radiate light. The resistor 5 is optionally provided in series with electroluminescent element 2 when the element has insufficient impedance to prevent shock.

The touch-sensitive switch 3 is preferably an array of conductive surfaces which is basically a pair of spaced conductors. These conductors are arranged so that a digit placed in contact with the surface provides a current path through the skin surface between the conductors. As an example, the switch 3 can be a pair of metal wires stretched across a rigid insulator surface. To form a semitransparent switch, a pair of very thin wires can be wrapped several times around a glass plate.

It is not necessary, but often desirable, that the current path supplied by the digit surface be a low impedance relative to the electroluminescent element. The essential requirement is that the resulting current bias the electroluminescent element to the "ON" condition—this could be done with a higher voltage.

The light $\gamma$ radiated by the electroluminescent element 2 serves two functions: it is a direct visual indicator of the ON state of the circuit and it provides a signal in the form of light which is suitable for controlling associated circuits. The secondary circuit illustrated in FIGURE 1 is comprised of a photoconductor (PC) 4 in series with a controlled circuit 6. Photoconductor such as cadmium selenide is characterized by a variation of resistance from greater than 100 megohms to typically 100 kilohms per square between the light exposed and dark states. Accordingly, a photoconductor serves as an effective ON-OFF switch for a serially connected load having an impedance intermediate that of the photoconductor impedance extremes. A controlled circuit 6 can be any electrical or electronic circuit for which a photoconductor serves as a suitable switch. For example, triggering pulses for a transistor load circuit can be switched by a serially connected photoconductor. Also, the controlled circuit 6 can be comprised of additional electroluminescent and photoconductor elements. A desirable characteristic of this arrangement is that the touch-sensitive circuit is electrically isolated from the controlled circuit because of the use of light coupling.

Figures 2, 3:
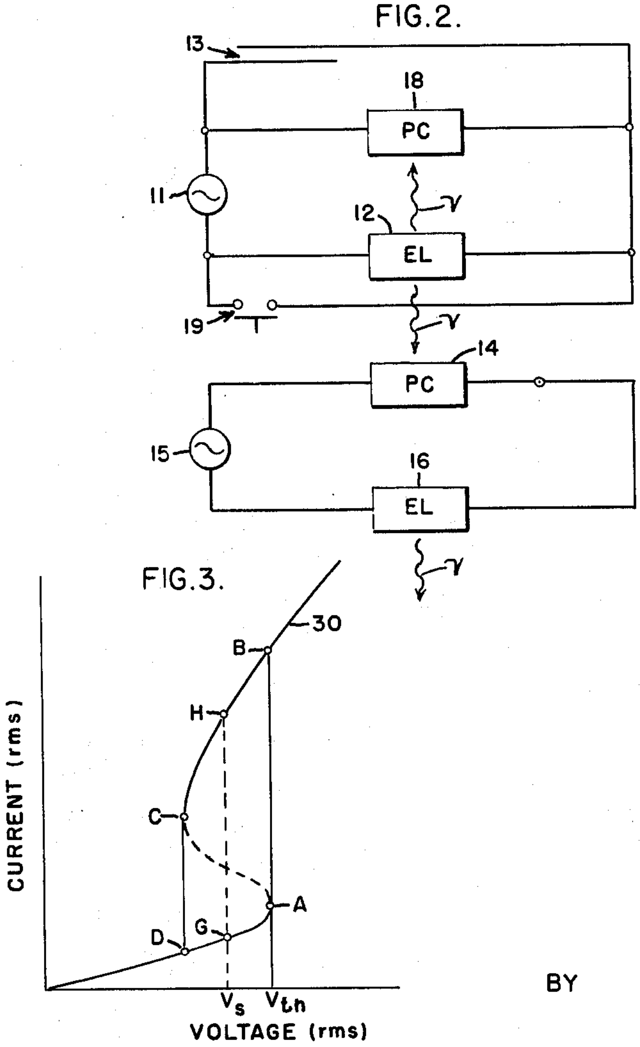
FIGURE 2 is a diagram of a touch-sensitive circuit employing an electroluminescent element and a photoconductor providing a lock-on feature.
FIGURE 3 is a graph of current versus voltage for a series connected pair consisting of an electroluminescent element and a photoconductor.

FIGURE 2 illustrates a touch-sensitive circuit having a lock-on operating feature. This circuit includes component parts similar to those in FIGURE 1 comprising a primary circuit of a voltage source 11, an electroluminescent element 12 and a touch-sensitive switch 13, and a secondary circuit of a photoconductor 14, a voltage source 15 and an electroluminescent element 16. The primary modification of the FIGURE 1 circuit is the addition of photoconductor 18. This element is connected in parallel with the touch-sensitive switch 13 and is arranged to receive a portion of the light $\gamma$ radiated by electroluminescent element 12 so that its resistance is reduced to a small value relative to the electroluminescent element impedance when the electroluminescent element 12 is activated to the ON state by digit contact of touch-sensitive switch 13. The photoconductor 18 provides an electrical path in parallel with the touch-sensitive switch 13 which has an impedance greater than a hundred megohms when the photoconductor is dark and is therefore effectively an open circuit when the touch-sensitive circuit is OFF. However, when the circuit is activated by digit contact to the ON state, the electroluminescent-photoconductor pair produces a regenerative action whereby light radiated by electroluminescent element 12 reduces the impedance of photoconductor 18 to a point where light radiation by the element is maintained independently of switch 13. The electroluminescent-photoconductor pair, when series connected with an appropriate voltage source, is bistable. The electroluminescent element can be radiating light and maintaining the photoconductor in the low impedance state which in turn maintains the electroluminescent element in a light radiating condition. This is the ON state. Alternatively, the electroluminescent element can be dark (not radiating light) and the photoconductor in a high impedance condition. This is the OFF state. Under these conditions, the touch-sensitive circuit will remain in the ON state after a digit which initiates switching is removed. That is, after the touch-sensitive circuit is activated by digit contact, the photoconductor 18 is reduced to a low impedance state which locks on the circuit by applying an activating voltage to the electroluminescent element independently of touch-sensitive switch 13. To return the touch-sensitive circuit to the OFF state, a second switch is provided to effectively short the electroluminescent element and thereby return that element and the associated photoconductor to a dark condition. The switch 19 in FIGURE 2 is connected in parallel with the electroluminescent element 12 to reduce the voltage across the element to turn the circuit OFF. The switch 19 may be identical to touch-sensitive switch 13 or may be a photoconductor.

The circuits of FIGURES 1 and 2 have been described as utilizing "electroluminescent elements" and "photoconductors". These terms may sometimes be considered to connote specific classes of semiconductors of which zinc sulphide and cadmium selenide are respective examples. However, any devices which function in the manner described can be employed in practicing the invention. For example, neon glow tubes also radiate light as an increasing function of the applied voltage over a portion of their characteristic. Unlike electroluminescent elements, the impedance of the neon glow tube drops to a low value when the tube is lighted. Accordingly, while neon glow tubes are generally suitable for touch-sensitive circuits, they generally require a series impedance to prevent shock resulting from the low impedance state when lit. These tubes are also not easily adapted to printed circuit type fabrication.

FIGURE 3 is a graph of current versus voltage for a series-connected pair of electroluminescent and photoconductive elements which illustrates the bistable characteristic of the pair. If a voltage increasing from a zero value is applied across the pair, the characteristic 30 results. For small values of voltage, the increase of current with increased voltage is approximately linear and is largely determined by the high impedance of the photoconductor in the dark state. The region of this approximately linear relationship extends to point A on the characteristic which is the point where a threshold voltage $V_{th}$ is applied across the pair such that the voltage across the electroluminescent element reaches the threshold level for the regenerative increase of light radiation. This regenerative action is caused by the reduction of the voltage across the photoconductor which increases the voltage across the electroluminescent element, etc. Accordingly, the state of the pair switches to point B where there is a large increase in current resulting from the low impedance state of the photoconductor and a substantial amount of light is radiated by the electroluminescent element. Further increase in the applied voltage results in increased currents above A at an approximately linear rate which is greater than the rate present when the photoconductor is in the dark state because of the reduced impedance of the photoconductor. The ratio of impedances for the dark and lit states of the photoconductor is typically several hundred. If the voltage is subsequently reduced after the pair is switched to the ON state, there is a reduction in current along the characteristic 30 until a point C is reached below which the electroluminescent element has insufficient voltage applied to maintain light radiation. When the voltage is reduced below this point the pair switches to the OFF state point D where there is small current through the pair and most of the voltage appears across the dark photoconductor.

When an electroluminescent-photoconductor pair is arranged as illustrated in the circuit of FIGURE 2 and a voltage $V_s$ is applied across the pair, the circuit (with the operating characteristic 30) will have two stable states indicated at G and H. The low current point G corresponds to the OFF state in which there is insufficient voltage appearing across the electroluminescent element to maintain substantial radiation of light and most of the voltage appears across the dark photoconductor. The high current point H corresponds to the ON state where the electroluminescent element 12 radiates light and maintains the photoconductor in a low resistance state. The touch-sensitive switch 13 provides means for decreasing the voltage across the photoconductor and thereby increasing the voltage across the electroluminescent element. When the switch 13 is touched by a digit, the voltage thereacross results in the desired increase of voltage across the electroluminescent element 12 which exceeds the necessary threshold value where an increment of voltage across the electroluminescent results in a greater reduction in the voltage across the photoconductor. Similarly, the touch-sensitive switch 19 provides convenient means for switching these circuits to the OFF state. This switch effectively shorts out the electroluminescent element 12 and thereby stops the radiation of light which results in the photoconductor assuming the large resistance value of its dark state.

Figure 4C:
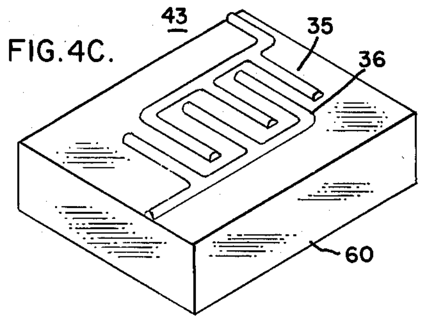
FIGURES 4A, 4B and 4C are illustrations of suitable components for application in the touch-sensitive circuits of FIGURES 1 and 2 as an electroluminescent element, a photoconductor, and touch-sensitive switch, respectively, and adapted for printed circuit type fabrication.
Figure 4B:
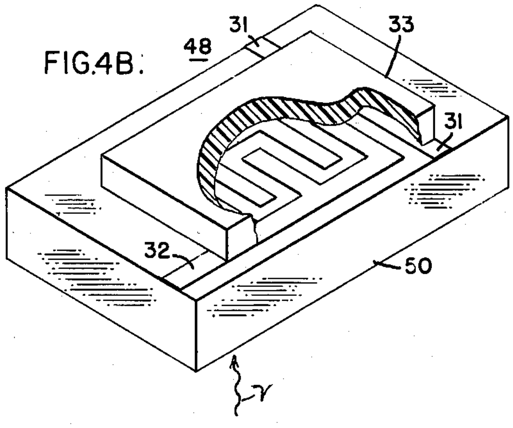
Figure 4A:
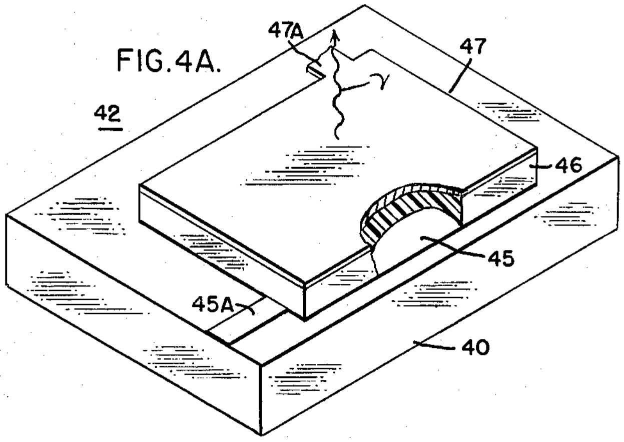

FIGURE 4A illustrates an electroluminescent element 42 adapted for printed circuit type fabrication. The electroluminescent element is conveniently of the type disclosed in the 1961 International Solid-State Circuits Conference, Digest of Technical Papers ("Gain and Geometrical Considerations in Planar Optoelectronic Circuits," by T. E. Bray). The electroluminescent element is comprised of a pair of conductive plane electrodes between which a dielectric-phosphor mix is sandwiched. A first metallic electrode 45, preferably reflective, and optionally transparent is formed as a film on a dielectric substrate 40. Extensions of the electrode such as 45A form electrical connections to the electroluminescent element. The electroluminescent material 46 is a dielectric in which a phosphor such as activated zinc sulfide is mixed. The material is formed over the electrode 45 by a process such as silk-screening. The second electrode 47 is a transparent conductor such as tin oxide which generally serves as a common ground. The transparent electrode 47 is conveniently formed on a second, transparent dielectric substrate (not shown) as a film having extensions such as 47A to form circuit interconnections.

The electroluminescent element 42 radiates light $\gamma$ when connected to a voltage source which produces an electric field in the dielectric between the electrodes. The light radiated is generally within a range of frequencies which gives the light a very distinct color. The peak frequency at which the greatest amount of light is radiated is a function of the material and the frequency of the voltage source. Presently available materials permit a large range of choice, but orange phosphors are generally selected because they are compatible with the available photoconductors and have a long operating life. The planar configuration gives excellent efficiency since the metallic electrode 45 reflects most of the incident light.

FIGURE 4B illustrates a photoconductor 48 compatible with the electroluminescent element 42 and adapted for printed circuit type fabrication. A zinc borosilicate glass plate 50 serves as a substrate for the photoconductor 48. A pair of interdigital film electrodes 31 and 32 are formed on the substrate 50 by sputtering platinum through a mask. The electrodes are each formed in a comb like configuration and placed in an interlocking arrangement whereby the electrode perimeters are a fixed distance apart. A photoconductive material such as cadmium selenide or cadmium sulphide is deposited over the electrodes 31 and 32 so that a light sensitive surface extends between the electrodes. When light $\gamma$ from a source such as electroluminescent element 42 falls on the photoconductive material 33, the resistance of the device can be reduced by a factor exceeding 10,000. Photoconductors of cadmium selenide which are illuminated by a light intensity of one foot-lambert in the lit state provide satisfactory impedance ratios. The photoconductors are typically fabricated to provide a dark impedance at least ten times that of the impedance of the associated electroluminescent element. To prolong the photoconductor life, the photoconductors may be encapsulated with epoxy material.

FIGURE 4C illustrates a touch-sensitive switch 43 adapted for printed circuit type fabrication. The switch is simply a network of fixed conductors 35 and 36 arranged on a dielectric plate 60. In an application where it is desired that the assembly be transparent to permit light from an electroluminescent element 42 to pass through, the plate 60 is a transparent glass and conductors 35 and 36 consists of transparent conductive materials such as tin oxide. The conductors are arranged so that digit contact results in bridging along as much of the conductors' perimeter as is possible, with as narrow a gap as is consistent with an open circuit condition in the absence of digit contact.

The touch-sensitive switch 43 illustrated in FIGURE 4C relies on a relatively low resistance to provide a low impedance connection with digit contact. However, a connection which maintains a very high resistance but which produces a low reactance by means of a large capacitance can also provide a sufficiently low impedance connection for an A.-C. electroluminescent circuit.

Figure 5:
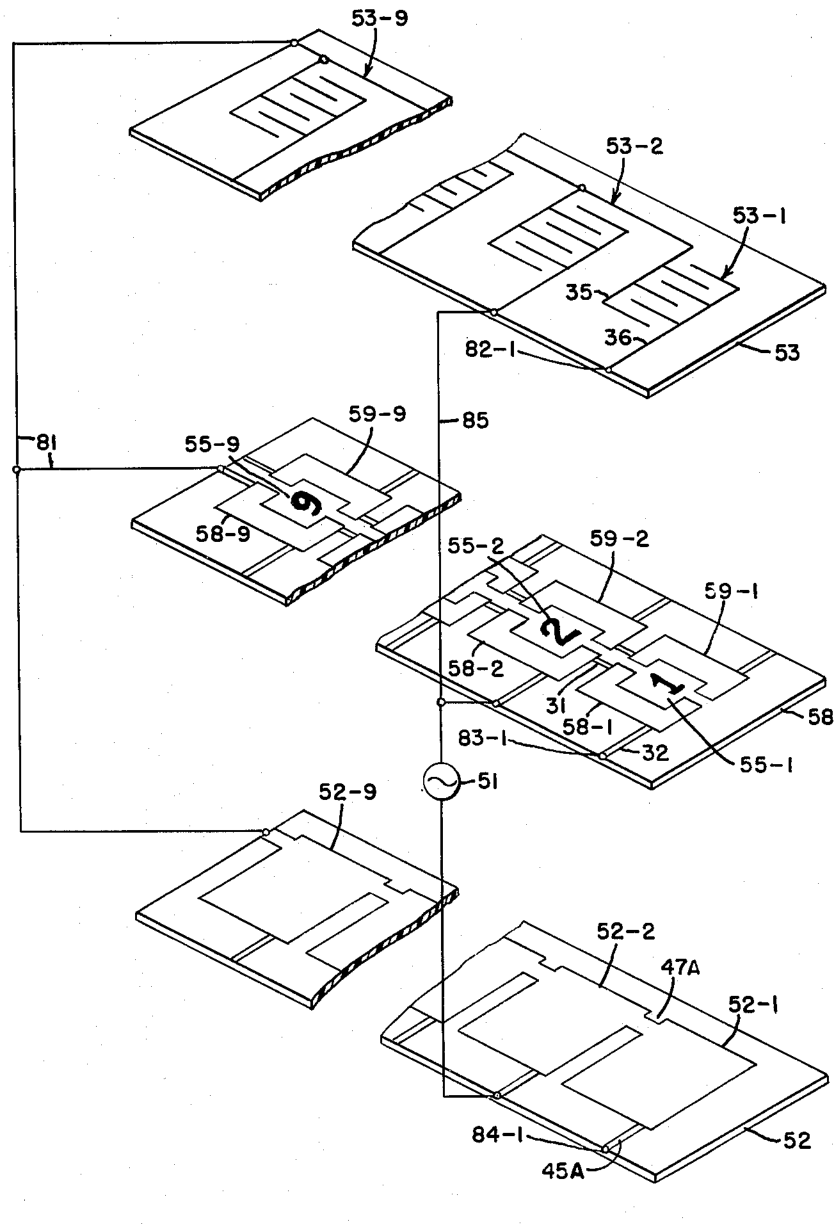
FIGURE 5 is an exploded diagram of a bank of touch-sensitive circuits having a printed circuit type construction.

FIGURE 5 is an exploded diagram of a plurality of individual electroluminescent-photoconductor pairs in a key board type arrangement. The bank is comprised of a series of pairs which are electrically similar to the circuit of FIGURE 2 but adapted for printed circuit type fabrication by the mechanical constructions illustrated in FIGURES 4A, 4B and 4C and are provided with visual indicia. The bank is comprised of three thin panels superimposed upon each other. The top panel 53 is a transparent dielectric panel having formed thereon a series of transparent conductor networks 53–1, 53–2 . . . 53–9, where each network such as 53–1 is formed like the touch-sensitive switch 43 in FIGURE 4C. Switch 53–1 is comprised of a pair of conductors 35 and 36. The former is connected to a common line 81 and the latter is connected to a terminal 82–1. The conductor network resulting appears as a series of bridge elements which are adapted to be bridged by a digit. The second panel 58 is also a transparent dielectric body upon which a series of primary photoconductors 58–1, 58–2 . . . 58–9 are formed as in FIGURE 4B. These photoconductors are arranged so that each one, such as 58–1, has one electrode 31 connected to common line 81 and the second electrode 32 connected to a terminal 83–1 which is connected to line 85. A series of secondary photoconductors is also provided at 54–1, 54–2 . . . 54–9 which provide switches which control associated circuits in accordance with the key operation. Also on panel 58 is formed a suitable character mask for each electroluminescent-photoconductor pair at 55–1, 55–2 . . . 55–9. These masks form outlines for indicia such as "1," "2," . . . "9". The third and bottom panel 52 is also a thin dielectric panel on which is formed the electroluminescent elements 52–1, 52–2 and 52–3 which perform the dual functions of locking the respective touch-sensitive circuits in the ON state and which radiate light around the indicia mask to provide the visual indication.

The FIGURE 5 key bank is essentially a plurality of lock-on circuits, each of which corresponds to the lock-on circuit of FIGURE 2. For example, with terminals 83–1 and 84–1 connected across a suitable common source of constant voltage, the photoconductor 58–1 and electroluminescent element 52–1 are serially connected by a common line 81 to provide a bistable pair. The touch-sensitive switch 53–1 is connected in parallel with photoconductor 58–1 by common line 81 and the line 85 between terminals 52–1 and 53–1 to provide the manually operated activating means for the electroluminescent-photoconductor pair. A switch connected in parallel with electroluminescent element 52–1 (as shown schematically in FIGURE 2 at 19) inactivates each touch-sensitive key. A series of photoconductors connected between the common line 81 and the individual electroluminescent electrode terminals such as 84–1 provide convenient inactivating switches. These photoconductors are conveniently formed on the underside of panel 52 on an opaque substrate (not shown in FIGURE 5) which when associated with a common electroluminescent element provide means for "clearing" a key bank.

Figures 6, 7:
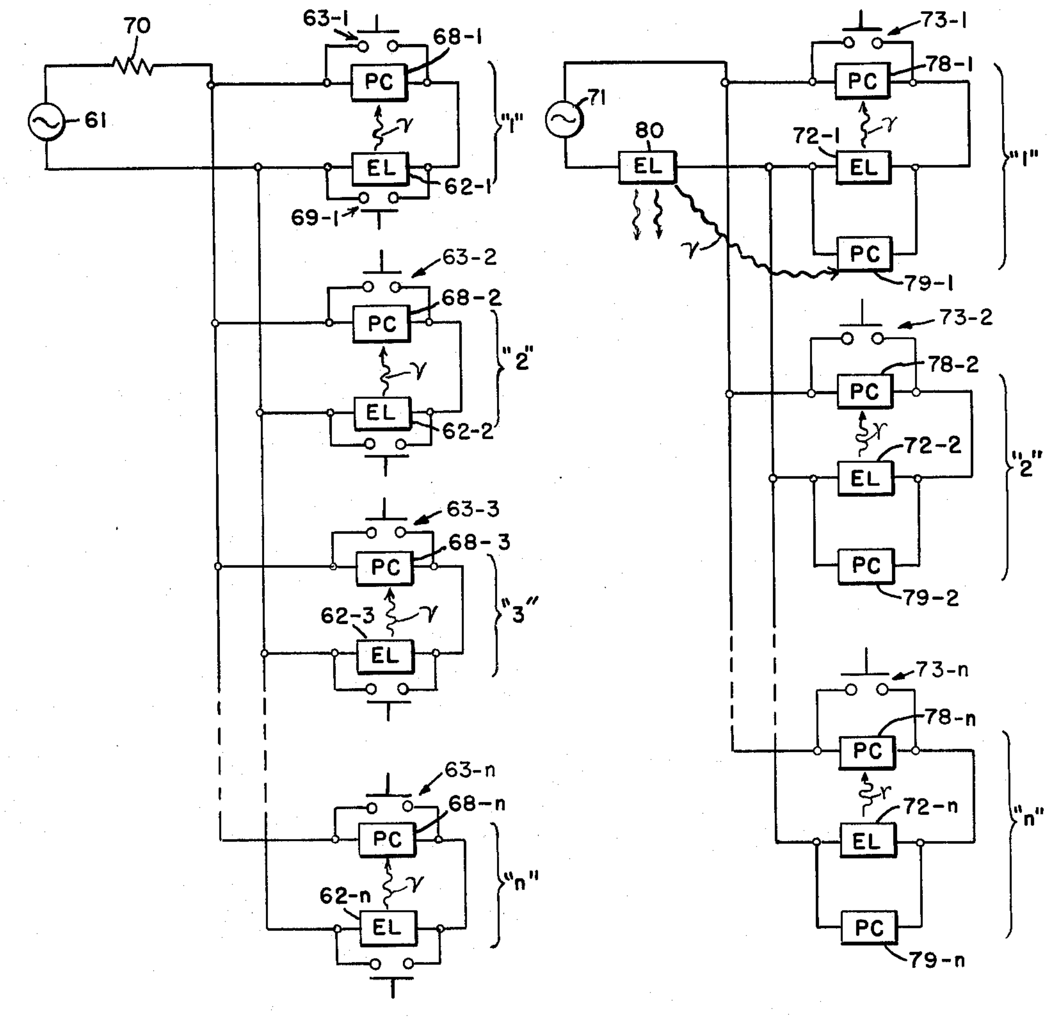
FIGURE 6 is a diagram of one embodiment of a bank of touch-sensitive circuits which are adapted to perform a lock-out function.
FIGURE 7 is a diagram of a second embodiment of a bank of touch-sensitive circuits adapted to perform a lock-out function.

FIGURE 6 illustrates an arrangement of a bank of touch-sensitive electroluminescent-photoconductive pairs such as are appropriate for a bank of keys which incorporates a lock-out operating feature. A voltage source 61 and a series impedance 70 provide a constant amplitude power source for the bank, corresponding to the voltage source 11 in FIGURE 2. The elements of the bank are comprised of a series of electroluminescent elements 62–1, 62–2, 62–3 . . . **62–*n* and photoconductors 68–1, 68–2, 68–3 . . . 68–*n*. The electroluminescent elements and photoconductors such as 62–1 and 68–1 are connected as pairs parallel with all other pairs and arranged so that light radiated from each electroluminescent element falls on the respective photoconductor 68–1. Each pair is provided with an activating switch shown as 63–1, 63–3 . . . 63–*n*, which switch the pairs to an ON state in the same manner as the touch-sensitive switch 13 in FIGURE 2. Also provided are switches such as 69–1 which turn off the pair in the same manner as switch 19** in FIGURE 2, but which are normally controlled automatically rather than by touch.

The FIGURE 6 circuit is substantially a schematic diagram of the FIGURE 5 key bank and accordingly, the operation of each electroluminescent-photoconductor pair will be substantially the same as that described in the FIGURE 2 circuit. However, to provide the lock-out operation, impedance 70 and the circuit parameters are selected so that only one pair can be in the ON state at any one time and a previously activated pair will be put in an OFF state by subsequently activating a second pair. This mode of operation is dependent upon voltage source 61 and the impedance 70 having values such that there is only sufficient voltage available to maintain one pair in the ON state. For example, when the resistance of impedance 70 is equal to the resistance of an electroluminescent-photoconductor pair, the voltage appearing across the pair is that corresponding to point H in FIGURE 3. If a second pair was activated to the ON state the voltage appearing across both pairs would tend to drop to approximately two thirds of the voltage at point H as represented in FIGURE 3. Under this circumstance neither pair could remain in the ON state. The result is that the electroluminescent-photoconductor pair which was first activated is returned to the OFF state, the second pair is then activated, and the desired lock-out function is performed.

FIGURE 7 illustrates a second embodiment of a bank of electroluminescent-photoconductor pairs which incorporates a lock-out operating feature. In a manner similar to FIGURE 6 and FIGURE 2, a voltage supply 71 is connected in series with an electroluminescent element 80 for performing the lock-out function. The bank of electroluminescent photoconductor pairs is comprised of the elements 72–1, 72–2 . . . **72–*n* and 78–1, 78–2 . . . 78–*n* corresponding respectively to the electroluminescent elements and photoconductors in FIGURE 6 and which are similarly connected and arranged. These pairs will also include switches corresponding to those in FIGURES 2 and 6, there being schematically illustrated only, switches 73–1, 73–2 and 73–*n* connected in parallel with photoconductors 78–1, 78–2 and 78–*n*, respectively. In addition to these, the electroluminescent element in each pair is provided with a photoconductor 79–1, 79–2 . . . 79–*n*, which is connected in parallel with the element and is arranged to receive light from the electroluminescent element 80 when any pair is activated to the ON state but (unlike switch 19 in FIGURE 2) it has sufficient impedance to permit substantial light radiation by the corresponding electroluminescent element. In a manner similar to the operation of FIGURE 6, this circuit is incapable of maintaining more than one pair in the ON state. This is because the photoconductors 79–1**, etc. are selected so that there is insufficient voltage to maintain two pairs in the ON state. When the activating switch for a second pair is closed, there will be sufficient voltage to maintain its electroluminescent element in a light radiating state. The previously activated pair will be turned off and the lock-out function is performed.

While the fundamental novel features of the invention have been shown and described as applied to illustrative embodiments, it is to be understood that all modifications, substitutions and omissions obvious to one skilled in the art are intended to be within the spirit and scope of the invention as defined by the following claims.

What is claimed is:

1. An optoelectronic circuit construction comprising:
(a) an electroluminescent element including
(b) a first layer of nonconducting material, and
(c) a sandwiched arrangement of an electroluminescent phosphor layer disposed between and in electrical contact with a pair of conductive plane electrodes, said sandwiched arrangement overlaying said first layer,
(d) a touch sensitive switching element adapted to be electrically coupled to said electroluminescent element, including
(e) a second layer of nonconducting material, and
(f) a plurality of spaced apart conductive strips overlaying said second layer, said conductive strips arranged to be bridged by a digit surface so as to selectively provide a conductive path between said strips, said touch sensitive switching element being superimposed on and forming an integral unit with said electroluminescent element.

2. An optoelectronic circuit construction comprising:
(a) a nonconductive substrate,
(b) a sandwiched arrangement of an electroluminescent phosphor layer disposed between and in contact with a pair of conductive electrodes, said sandwiched arrangement overlaying said substrate,
(c) a layer of nonconducting material overlaying said sandwiched arrangement, and
(d) a pair of interdigital conductive strips adapted to be electrically coupled to the electrodes of said sandwiched arrangement formed on said layer of nonconducting material, said conductive strips arranged to be bridged by a digit surface so as to selectively provide a conductive path between said strips.

3. An optoelectronic circuit construction as in claim 2 wherein said layer of nonconducting material is transparent.

4. An optoelectronic circuit construction comprising:
(a) an electroluminescent element including
(b) a first layer of nonconducting material, and
(c) a sandwiched arrangement of an electroluminescent phosphor layer disposed between and in electrical contact with a pair of conductive plane electrodes, said sandwiched arrangement overlaying said first layer,
(d) a photoconductor element in radiation coupled relationship with said electroluminescent element including
(e) a second layer of nonconducting material,
(f) a pair of electrodes overlaying said second layer, and
(g) a layer of photoconductive material deposited on and in electrical contact with said pair of electrodes,
(h) a touch sensitive switching element adapted to be electrically coupled to said electroluminescent element including
(i) a third layer of nonconducting material, and
(j) a plurality of spaced apart conductive strips overlaying said third layer, said conductive strips arranged to be bridged by a digit surface so as to selectively provide a conductive path between said strips, said touch sensitive switching element, photoconductive element and electroluminescent element being superimposed upon one another and forming an integral unit.

5. An optoelectronic circuit construction including an array of electroluminescent elements, photoconductive elements and touch sensitive switching elements, comprising:
(a) a nonconductive substrate,
(b) a sandwiched arrangement of an electroluminescent phosphor layer in electrical contact with a plurality of conductive plane electrodes disposed on one side of said phosphor layer, each electrode adapted to be separately coupled to a source of voltage, and a common plane electrode disposed on the opposite side of said phosphor layer, said sandwiched arrangement overlaying said substrate and forming a plurality of electroluminescent elements,
(c) a layer of nonconducting material overlaying said sandwiched arrangement,
(d) a plurality of pairs of electrodes overlaying said layer of nonconducting material,
(e) a layer of photoconductive material deposited on and in electrical contact with said electrodes so as to provide a plurality of photoconductive elements adapted to be in a radiation coupled relationship with said electroluminescent elements,
(f) a second layer of nonconducting material overlaying said photoconductive material, and (g) a plurality of pairs of interdigital conductive strips adapted to be electrically coupled to the electrodes of said electroluminescent elements formed on said second layer of nonconducting material, each pair of conductive strips arranged to be bridged by a digit surface so as to selectively provide a conductive path between the conductive strips of said pairs of strips.

6. An optoelectronic switching circuit having a lock-out operating function comprising: a plurality of electroluminescent-photoconductive pairs electrically connected in parallel, the electroluminescent and photoconductor elements of each said pair being optically coupled and electrically series connected and having a bistable current-voltage characteristic for which the high current state is accompanied by substantially greater intensity light radiation then the low current state, a voltage source for energizing the electroluminescent elements of said plurality of pairs, a common electroluminescent cell connected in series between said voltage source and said plurality of pairs, a plurality of second photoconductors each electrically connected in parallel with a respective electroluminescent element of each said pair and in optically coupled relationship with said common electroluminescent element for reducing the voltage across the respective electroluminescent elements, a plurality of independently controllable activating switches each connected in parallel with a respective photoconductor of each said pair, actuation of said switches placing increased voltage across the respective electroluminescent element, whereby in response to actuation of one of said switches only the electroluminescent-photoconductor pair associated therewith becomes energized into its high current state, the remaining electroluminescent-photoconductor pairs being inhibited from entering the high current state due to insufficient voltage present across the electroluminescent elements of said remaining pairs.

References Cited by the Examiner

UNITED STATES PATENTS

| | | | |
|---|---|---|---|
| 2,186,825 | 1/40 | Dome | 200—52 |
| 2,576,929 | 12/51 | Ercolino | 200—159 |
| 3,056,887 | 10/62 | Diemer et al. | 250—213 |

OTHER REFERENCES

Astrahan: IBM Technical Disclosure Bulletin, Volume 3, No. 3, page 65, August 1960.

RALPH G. NILSON, *Primary Examiner.*

WALTER STOLWEIN, *Examiner.*